United States Patent
Bady et al.

(10) Patent No.: US 6,303,897 B1
(45) Date of Patent: Oct. 16, 2001

(54) PROCESS AND DEVICE FOR LASER TREATMENTS OF INSIDE SURFACES

(75) Inventors: Torsten Bady, Todesfelde; Michael Bohling, Bremen; Gunter Lensch, Hamburg; Alfons Fischer, Essen; Franz-Josef Feikus, Bonn; Achim Sach, St. Augustin, all of (DE)

(73) Assignee: Vaw Motor GmbH, Bonn (DE)

( * ) Notice: Subject to any disclaimer, the term of this patent is extended or adjusted under 35 U.S.C. 154(b) by 0 days.

(21) Appl. No.: 09/294,614

(22) Filed: Apr. 19, 1999

(30) Foreign Application Priority Data

Apr. 17, 1998 (DE) .................................................. 198 17 091
Jun. 12, 1998 (DE) .................................................. 198 26 138

(51) Int. Cl.[7] .................................................. B23K 26/00
(52) U.S. Cl. ................................ 219/121.65; 219/121.66; 219/121.73
(58) Field of Search ........................ 219/121.65, 121.66, 219/121.73; 92/223

(56) References Cited

U.S. PATENT DOCUMENTS

| | | | |
|---|---|---|---|
| 4,474,861 | * 10/1984 | Ecer | 428/614 |
| 4,785,775 | * 11/1988 | Dekumbis et al. | 123/193 |
| 4,966,748 | * 10/1990 | Miyasaka et al. | 419/8 |
| 4,974,498 | * 12/1990 | Lemelson | 92/223 |
| 5,958,332 | * 9/1999 | Hoeg | 420/442 |
| 5,976,711 | * 11/1999 | Dearnaley | 428/641 |

* cited by examiner

Primary Examiner—M. Alexandra Elve
(74) Attorney, Agent, or Firm—Collard & Roe, P.C.

(57) ABSTRACT

A process and device for the laser treatment of the internal surfaces of hollow bodies such as engine blocks with cylinder bores which consist of the matrix alloys such as a light-metal or aluminum, wherein a wear-resistant coating is applied to the working surfaces of the pistons within the cylinder. A probe enters the cylinder and includes the laser beam which produces a beam spot on the internal surface of the cylinder and applies an alloying powder at the focus of the spot using a continuously conveying protective gas. The probe is displaced along the axis of the cylinder and simultaneously rotated while the alloying powder is melted in the spot of the laser beam to a depth sufficient to form a wear-resistant coating which will not break loose during the normal operation and life of the engine block. The engine block can be fixed in a stationary position while the probe or probes move simultaneously within the cylinders to apply the hardened surface coating.

13 Claims, 5 Drawing Sheets

PROCESS AND DEVICE FOR LASER TREATMENTS OF INSIDE SURFACES

BACKGROUND OF THE INVENTION

1. Field Of the Invention

The invention relates to a process for the laser treatment of the inside surfaces of hollow pluralities with rotation-symmetric axes, which consist of a matrix alloy.

More specifically, this invention relates to the laser treatment of light metal engine cylinder blocks to provide a wear-resistant inner piston working surfaces. Furthermore, the invention relates to a device for carrying out such a process.

2. The Prior Art

It is known, for example from German Patent DE 3910098 A1 to weld pipes by means of a laser, whereby a rod-shaped probe with a lens system is disposed in a workpiece. In laser surface treatments, it is advantageous to also treat marginal surface coatings, especially on the inside of the workpiece, by the application of laser energy over wide surface areas.

Thus, it is an object of the invention to obtain increased amounts of alloying components in marginal coatings, as well as intermetallic compounds in these coatings, and to obtain a finer grain coating in the marginal layer, particularly in connection with cast aluminum or wrought alloys.

It is a further object of the invention to provide an increased resistance to abrasion in metallic materials, such as in engine block components and also in tools subject to wear, as well as in tubes and guide bushings.

In the prior art, wear-resistant workpieces were produced by alloying the entire material of the workpiece with an additional substance, such as, adding up to 17% silicon to an aluminum cast alloy. Where the surface is to be provided with higher wear resistance, the silicon coating provides a wear hardened surface. However, this makes the overall workpiece more brittle, which leads to substantial problems in the casting process.

SUMMARY OF THE INVENTION

Therefore, the present invention provides a treatment on workpieces for incorporating alloying components at a later time, that make a surface more resistant to wear, as well as providing a device for carrying out such a process.

The invention provides a process for alloying in substances, wherein the marginal layer is influenced by mixing the alloying components in the marginal zone by 100%. The process is preferably carried out using pure silicon powder for the alloying process with aluminum. With depths of penetration of from 0.2 mm to 2 mm, the separated silicon particles, with particle sizes of from 3 to 25 $\mu$m, make up a proportion by volume of from 17 to 50% in the marginal layer. This provides an increased resistance to wear of the aluminum matrix alloy.

It is advantageous if the laser light is directed to the surface with a distal energy of 20 to 800 J/mm, and an intensity of 0.5 to 4.0 kW/mm$^2$. The laser light has to be shaped so that a ▓tophat▓ distribution takes place.

Laser light wattages of 1.3 kW to 3 kW have been successfully employed in the past, whereby both Nd-YAG lasers and high-power diode lasers were employed. Laser light with wavelengths of 1064, 808 and 940 nm is advantageous for mixing up in the marginal zone, whereby the respective process parameters have to be coordinated with each other.

This particularly applies to the feed rate to be adjusted, which may be in the range of 300 to 4000 mm/min. The feed rate is, in each case, dependent upon the intensity, i.e., the wattage of the laser light, the way in which the focus is shaped, and on the thermal conditions at the melting site. These conditions are determined by the heat source, the volume of the melt, and the cooling rate. The process parameters have to be coordinated with each other so that the process of separation of hard-substance particles takes place with the desired concentration and particle size.

Thus, by employing a laser light beam which, at the site of impact, produces a material plasma, it is possible to incorporate powder in the locally produced plasma. By introducing an alloying powder with a grain size of preferably 45$\mu$ to 150$\mu$, it is possible to obtain with a laser light beam of 2 kW, a penetration depth of 1 mm over a spot diameter of 0.05 to 2 mm. This beam produces a sufficiently thick wear-resistant marginal layer, so that the latter will not detach itself from the workpiece under mechanical stress. At the same time, the selected conveying gas, for example a rare (or inert) gas, assures a separation of the plasma from reactive, oxygen-containing atmosphere. The wattage of the laser light is controlled so as to obtain a suitable distribution of primary and secondary hardened phases.

A silicon component of between 17% to 50% by volume so incorporated in the surface, advantageously assures that the elastic properties continue to be present as before in the depth of the workpiece. These properties permit absorption of the mechanical stresses, such as, for example, the working surfaces of the cylinders of an engine.

Considerable thermal problems have to be solved when an energy beam probe is disposed in a cylindrical segment of a workpiece. Apart from the heat reflected by the workpiece, the geometrical conditions lead to considerable heat at the head of the probe, which, according to the invention, is counteracted by water cooling.

Furthermore, the probe head of the invention is rotatable, so that apart from prior art equipment, where the workpiece has to be turned, the inventive probe can now remain stationary. This leads to an easier handling of the engine blocks that have to be treated because the laser light and alloying powder can be supplied in their conveying media to the probe head via a rotating passage.

Moreover, a pore-free result is possible through a suitable feed of the powder and gas when treating interior spaces. In this connection, it is necessary to make sure that with the proper guidance of the protective gas and design measures, that the applied powder will not deposit on the optics of the probe. If need be, a separate protective gas can be fed to the probe next to the beam of energy in addition to the conveying gas.

The probe is capable of treating the workpiece provided a few conditions are met. First, there should be a laser light wattage of approximately 2 kW on a beam spot having a diameter of about 0.5 to 2 mm, a feed rate of 300 to 1500 mm per minute, and a gas conveying rate of about 10 to 20 liters per minute. In addition, a powder feed of up to 10 grams per minute has to be added. For example, if the probe is focused on a surface site defined by spiral migration, then upon completion of one turn (or rotation) of the probe, the surface site being treated may migrate over the entire surface area to be treated by simultaneously lowering the probe. Thus, from 17% to 50% by volume of silicon is produced on the surface layer through alloying, whereby excess silicon powder is removed from the interior of the workpiece by transporting the excess powder away, especially together with the conveying gas.

The probe can then be focused in the space provided on a spirally migrating surface site. This occurs with an increased laser light wattage of 4 kW focused on a beam spot with a diameter of between 2 to 4 mm, and with a feed rate of between 1500 to 4000 mm per minute, and having a conveying gas feed of about 30 liters per minute, and wherein a powder feed rate of up to 20 grams per minute is added.

The invention is primarily suitable for treating internal spaces, for example, cylinders and tubes having a shaft ratio in excess of 1=10 (measured as the diameter to depth ratio), whereby the rod-shaped probe can be employed in a particularly favorable manner starting with diameters of 50 mm and more. Both the feed means for feeding the silicon powder in a conveying and protecting gas, and means for guiding the laser beam are arranged in the probe. The means for guiding the laser beam projects a beam of laser light via a collimating lens system onto a reversing mirror formed in the head of the probe. The focus can be formed with the reversing mirror, the latter being made of copper and cooled with water due to the high process temperatures. Furthermore, the mirror is preferably provided with an HR-coating. The mirror is a multifaceted mirror having from 5 to 50 facets with conically, thyroidal or parabolically shaped surfaces, which are arranged on conical segments.

This device is suitable particularly for carrying out surface treatments of the inner space of light metal engine cylinder blocks. Here, the probe providing the means for guiding the laser beam and for feeding silicon powder in a conveying and protecting gas can be lowered into the engine cylinders without rotating the block, a step that was formally necessary using prior art equipment.

By providing a turning drive in the probe in the end segment of the powder-feeding nozzle, and providing a device for projecting the beam of energy and with the help of a telescopic drive which lowers the probels end segment, a multitude of cylinders can be treated simultaneously by providing a plurality of probes for the cylinders.

In this connection, the rod-shaped probes of the invention provide a variable lens system, collimating a parallel beam of laser light over an extended distance, the lens system being formed upstream of a reversing mirror formed in the head of the probe. Moreover, there is provided a rotationally-decoupled through-passage for three process media-conducting means, for a cooling water feed, and return lines, as well as for gas conveying the powder, the through-passage being disposed in the extended, freely rotatable head of the probe in the marginal zone.

Finally, in the zone of the laser light outlet, there is provided a crossjet outlet disposed above the laser beam outlet, the crossjet outlet being connected with the protective gas feed line, and being directed downwardly. It is possible to select suitable geometry for the powder feed nozzle, depending upon the desired depth of penetration, and rate of progression, by simply changing the exchangeable end components.

The crossjet provided within the zone of the laser outlet is equipped with protective gas feed and cooling. With the small space available for the treatment, flow conditions exist in the interior spaces that greatly effect the melting of the marginal layer, and the powder feed. The crossjet is required as defined by the invention, in order to obtain a pore-free marginal layer.

It is possible with the laser optics, to produce a depth of focus of at least 1/100th of the work space. This describes the tolerance width of the tool in that additional alloying components can be alloyed therein, without readjusting the treatment distance. It is possible to produce both traces disposed next to one another with overlapping zones, and individually displaced traces and/or spiral-shaped traces resulting in higher economy. If the zones of added alloying are produced by the laser overlap, the cylinder working surface is fully covered. Partial covering is achieved with displaced or spiral-shaped laser guidance, which provides the same good protection against wear as full coverage, if the piston with piston rings moving in the cylinder are wider than the spacing between the individual traces produced by the laser.

Furthermore, it is possible to obtain full coverage on the cylinder wall working surface at the point of reversal of the piston and a partial coverage on the remainder of the working surface, thus providing a combination of the both types of coverage. Moreover, differently shaped laser traces such as, for example, meander or net-shaped structures are possible with the device of the invention. With partial coverage, depressions can be formed to create lubricating oil pockets in a targeted manner, to allow the lubricant to collect.

Moreover, with the device of invention, the probe can be very closely applied to the workpiece with a distance of only 70 mm, which is substantially less than the known distance of conventional powder-feeding devices, which is usually greater than 80 mm. Also, it is possible to eliminate a heat treatment step that would otherwise be required.

In addition to the laser light, a cooling medium (e.g. $H_2O$) and, if necessary, an additional protective gas for the crossjet— which gas may be air—are admitted to the probe head in addition to the process gases carrying the powder. This medium and additional gas are fed into the continuously revolving probe head via its rotary guidance system.

This is accomplished according to the invention by means of a rotationally-decoupled through-passage for the feed and return of cooling water. Within this zone, the laser beam is freely extending.

BRIEF DESCRIPTION OF THE DRAWINGS

Other objects, and features will become apparent from the following detailed description considered in connection with the accompanying drawings which disclose the embodiments of the invention. It should be understood however, that the drawings are designed as an illustration not as the definition of the limits of the invention.

In the drawings wherein similar reference characters denote similar elements throughout several views.

DETAILED DESCRIPTION OF THE INVENTION

Figure 1:
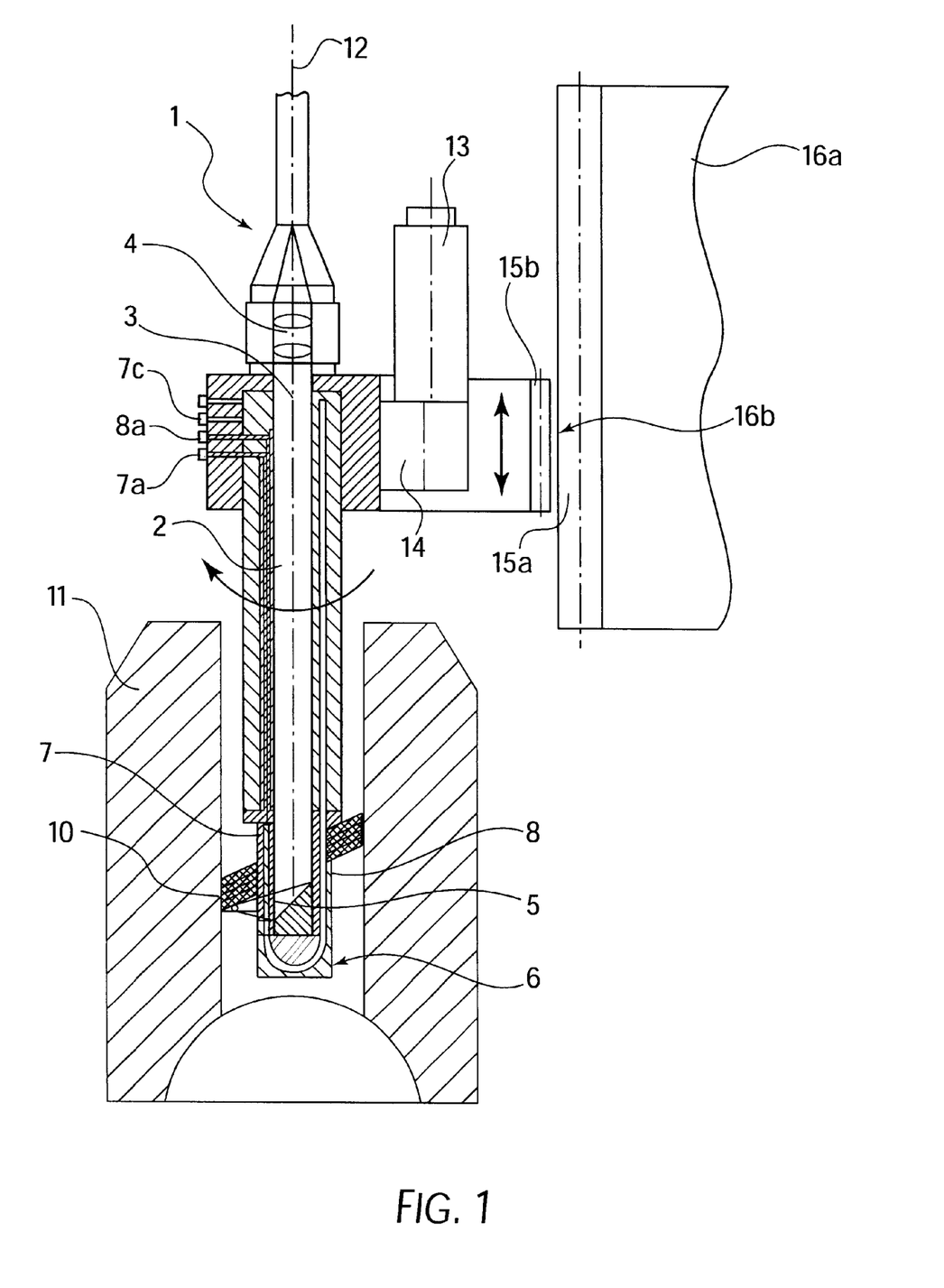
FIG. 1 shows a schematic cross sectional view showing the simplest form of a probe in operation.

FIG. 1 schematically shows the device of the invention for the laser treatment of an inside surface. The device has a rod-shaped probe 1, a laser beam guide 2 for a laser light beam 3, a collimating lens system 4, and a reversing mirror 5. The latter is arranged in a rotatable probe head 6, which accommodates conduits 7 and 8 for guiding a protective gas. The protective gas entering conduit 7 is reversed in the lower part of probe head 6, and exits via conduit 8. In this process, the gas intersects laser light beam 3, reflected by reversing mirror 5, and forms a crossjet 9. Due to the high energy of the powdered material in the site of impact on workpiece surface 10, a portion of the powdered material is thrown back. Crossjet 9 prevents that portion of the powder material from dropping back onto reversing mirror 5.

Laser beam 3 is directed to the internal cylinder of the engine block 11 having a surface 10. Probe 1 can be rotated along a vertical axis 12 by motor 13 and driving 14. Probe 1 can be further moved into the vertical direction by a guide member 15a, 15b of traverse 16a forming a telescopic drive 16b.

Figure 2:
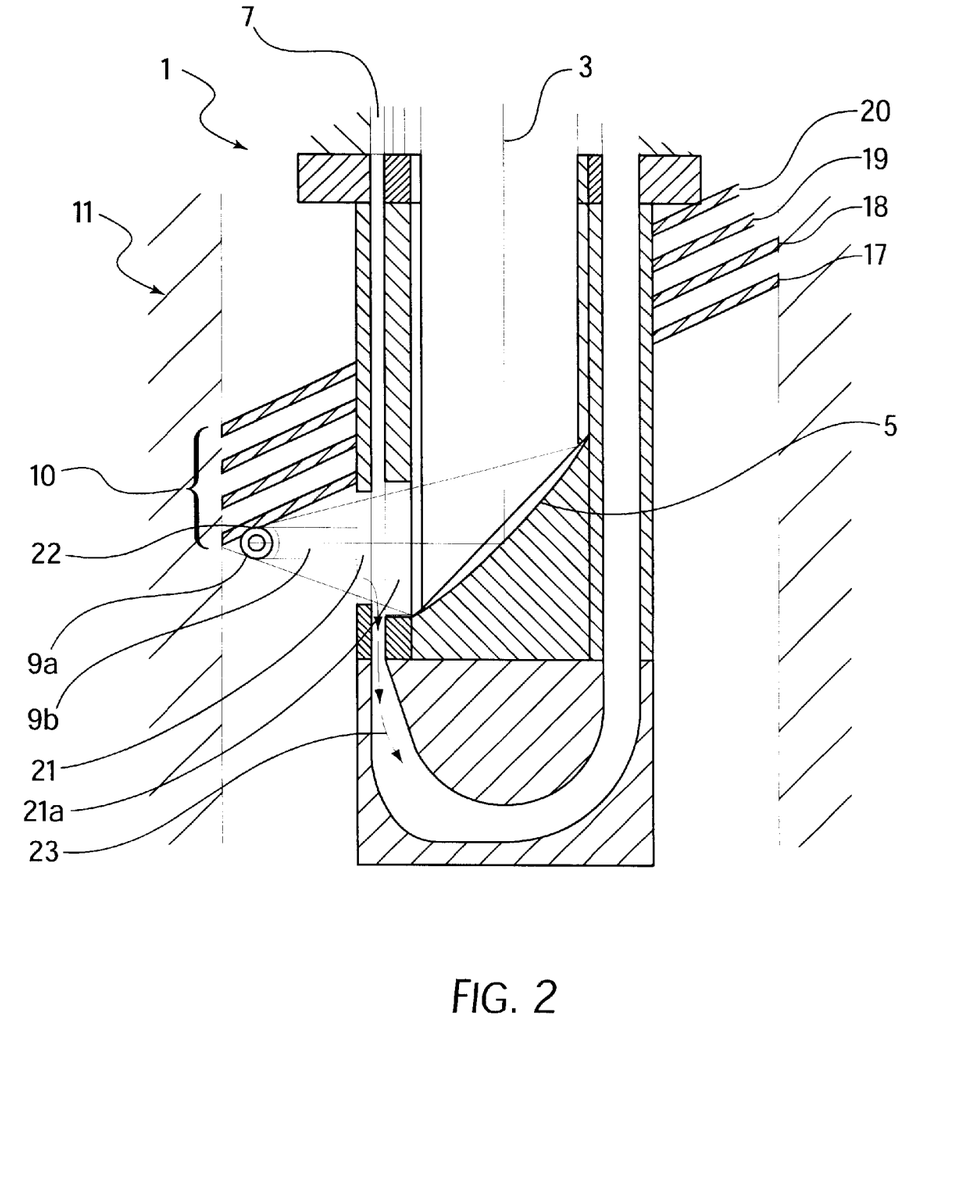
FIG. 2 shows an enlarged cross sectional view of the lower part of FIG. 1.

FIG. 2 is an enlarged cross-sectional view of the lower part of FIG. 1. It shows the laser beam 3 being reflected by mirror 5 onto the surface 10 of the internal cylinder of the engine block 11. A beam spot is produced by the laser beam 3 on the internal cylinder surface of the engine block 11. Since the rotation of the probe 1 and the displacement of probe 1 along the cylinder axis will be superimposed, a spiral-shaped winding 17, 18, 19, and 20 will be formed on the surface of the cylinder block.

A powder stream is led to the beam spot via pressure line 9a which has a passage onto the probe 1 and connection 7c at the top FIG. 1. Line 7b ends in a powder feeding nozzle 9b.

From FIG. 2 can also be seen that the protective gas flowing through conduit 7 will cross the reflected laser beam 3 when the laser beam 3 reaches an opening 21 in the probe 1. Since the protective gas is under pressure it prevents powder particles from being reflected from the surface 10 from passing through opening 21 and thereby preventing a protecting glass 21a from being contaminated and hereby protecting the mirror 5.

Particles which are reflected from the surface will be carried within the protective gas away from the alloying zone 22. The derivation of the reflected particles stream is schematically demonstrated by arrows 23 in FIG. 2.

Figure 3A:
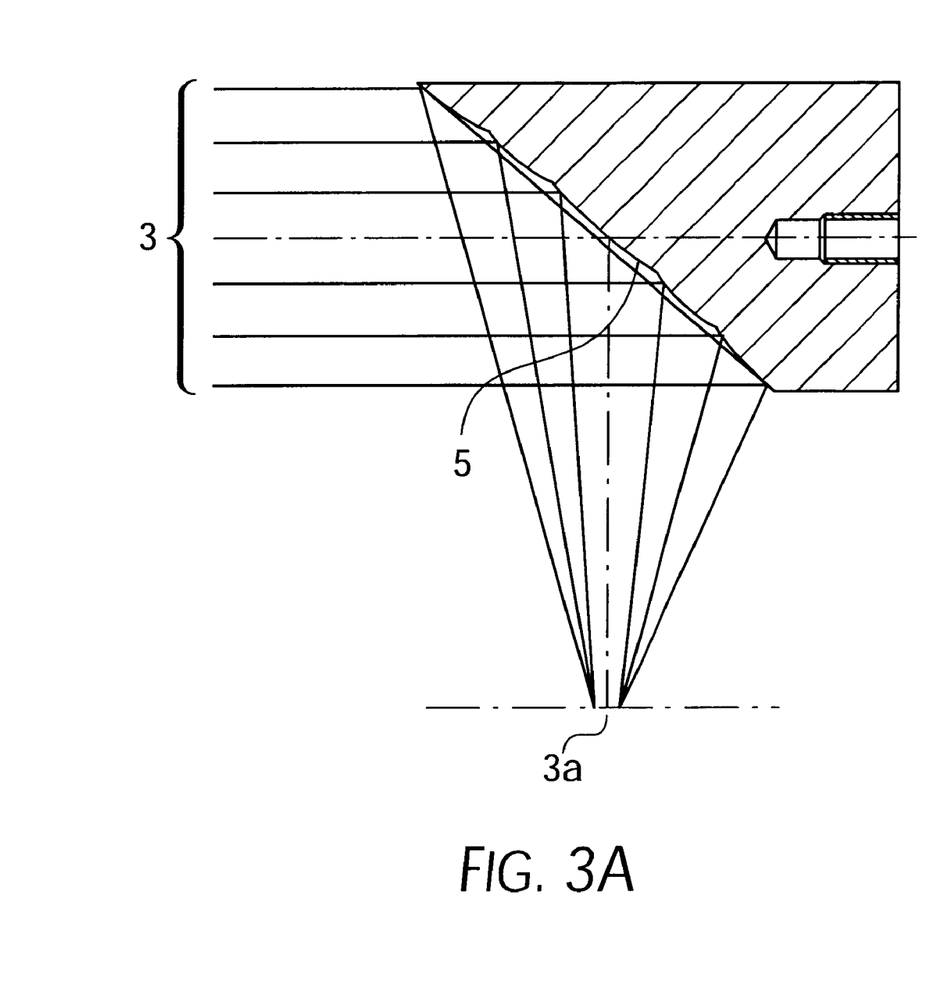
FIG. 3a shows the details of the reversing mirror in operation.
Figure 3B:
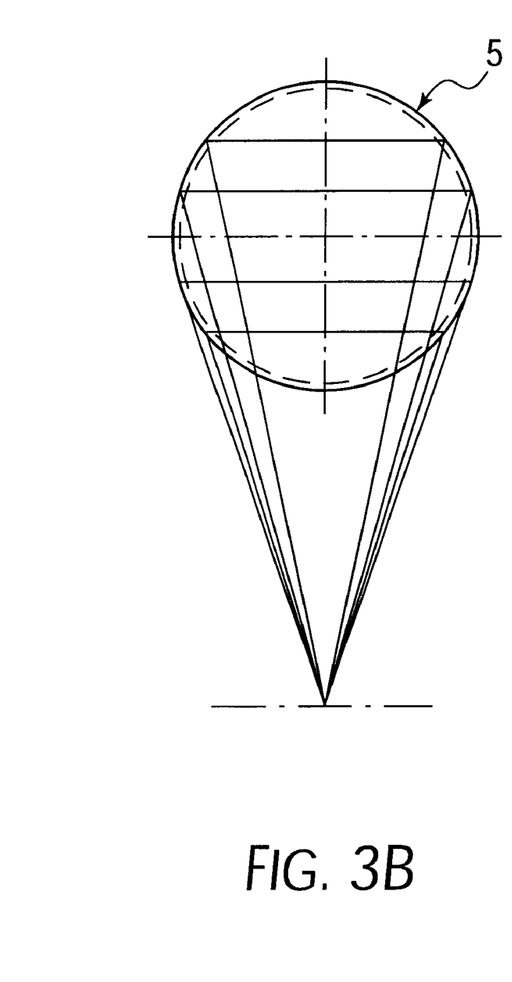
FIG. 3b shows the details of the reversing mirror in operation.

FIGS. 3a and 3b show details of reversing mirror 5 in operation. When reflected at the thyroidal or parabolically shaped facettes 5a the laser beam 3 is concentrated to a line shaped spot 3a. By movement of the line-shaped laser beam a spiral-shaped winding will be produced on the entire surface of the cylinder if the mirror 5 is rotated together with probe 1 along the cylinder axis.

FIG. 4 schematically shows four different working surfaces of a cylinder treated with the inventive process. In all four examples 4a, 4b 4c, 4d the top zone a is 100% alloying area being produced by an overlapping layer of spiral windings. This can be continued for the whole area of internal cylinder shown in FIG. 4a.

Figure 4A:
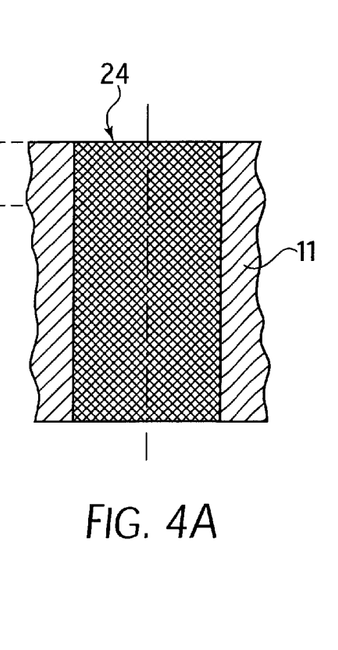
FIG. 4a shows a first working surface of a cylinder treated with the inventive process.
Figure 4B:
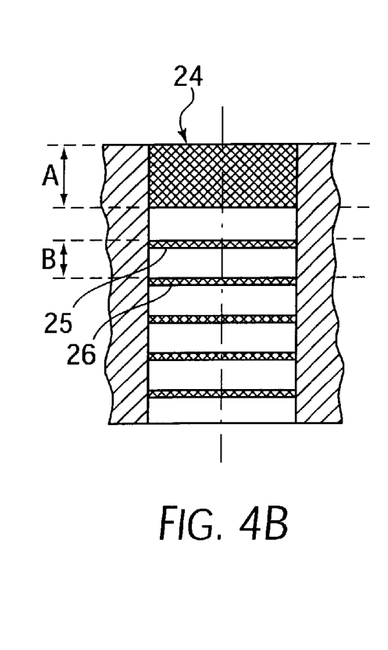
FIG. 4b shows a second working surface of the cylinder treated with the inventive process.
Figure 4C:
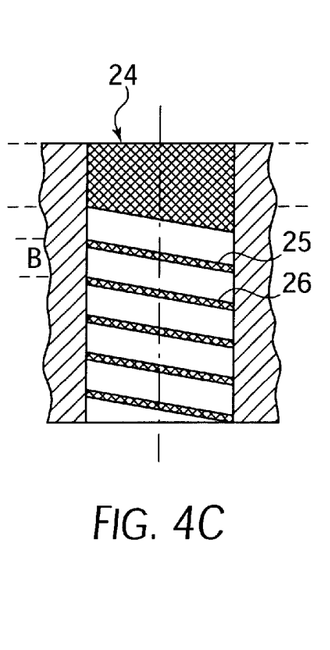
FIG. 4c shows a third working surface of the cylinder with the inventive process.
Figure 4D:
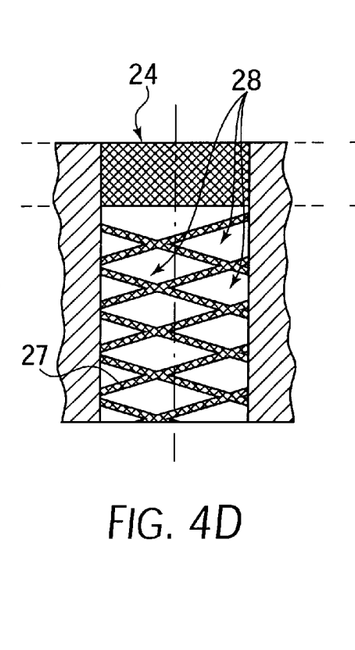
FIG. 4d shows a fourth working surface of the cylinder with the inventive process.

To reduce the production time, it is preferable to enlarge the distances B between the spiral shaped winding 25, 26 shown in FIG. 4b and FIG. 4c. FIG. 4d shows a net-shaped structure 27 of the windings creating depressions for a series of lubricating oil pockets 28. The net-shaped structure can be produced by shifting the depositing device from an upward to a downward movement.

Figure 5:
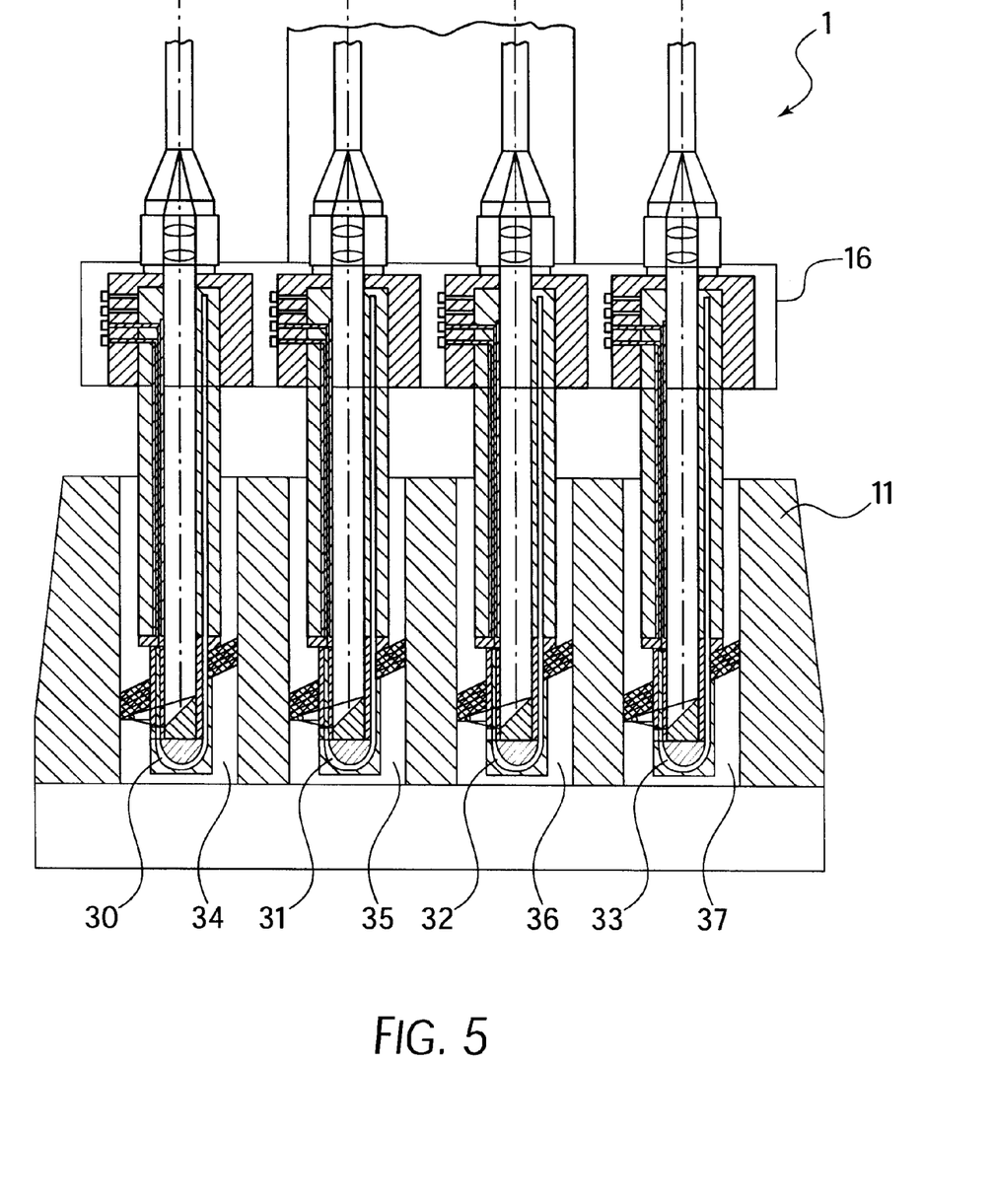
FIG. 5 shows a 4 cylinder engine and four probes.

FIG. 5 shows a 4 cylinder engine and four probes 30, 31, 32, 33, being simultaneously disposed into bores 34, 35, 36, and 37 of each cylinder of the 4 cycle engine. As explained with reference to FIG. 1, the probes 30–33 are simultaneously rotated to apply the spiral treatment to each inner surface of cylinders 34–37.

The process is preferably carried out using pure silicon powder for the alloying process with aluminum. With depths of penetration of from 0.2 mm to 2 mm, the separated silicon particles, with particle sizes of from 3 to 25 mm, make up a proportion by volume of from 17 to 50% in the marginal layer. This provides an increased resistance to wear of the aluminum matrix alloy.

It is advantageous if the laser light is directed to the surface with a distance energy of 20 to 800 J/mm, and an intensity of 0.5 to 4.0 kW/mm2. The laser light has to be shaped so that a ▓tophat▓ distribution takes place.

Laser light wattages of 1.3 kW to 3 kW have been successfully employed in the past, whereby both Nd-YAG lasers and high-power diode lasers were employed. Laser light with wavelengths of 1064, 808 and 940 mm are advantageous for mixing up in the marginal zone, whereby the respective process parameters have to be coordinated with each other.

This particularly applies to the feed rate to be adjusted, which may be in the range of 300 to 4000 mm/min. The feed rate is in each case, dependent upon the intensity, i.e., the wattage of the laser light, the way in which the focus is shaped, and on the thermal conditions at the melting site. These conditions are determined by the heat source, the volume of the melt, and the cooling rate. The process parameters have to be coordinated with each other so that the process of separation of hard-substance particles takes place with the desired concentration and particle size.

Thus, by employing a laser light beam which, at the site of impact, produces a material plasma, it is possible to incorporate powder into the locally produced plasma. By introducing an alloying powder with a grain size of preferably 45$\mu$ to 150$\mu$, it is possible to obtain with a laser light beam of 2 kW, a penetration depth of 1 mm over a spot diameter of 0.05 to 2 mm. This produces a sufficiently thick wear-resistant, marginal layer that will not detach itself from the workpiece under mechanical stress. At the same time, the selected conveying gas, for example a rare (or inert) gas, assures separation of the plasma from reactive, oxygen-containing atmosphere. The wattage of the laser light is controlled so as to obtain a suitable distribution of primary and secondary hardened phases.

A silicon component of between 17% to 50% by volume incorporated in the surface, assures that the elastic properties continue to be present in the depth of the workpiece. These properties permit absorption of the mechanical stresses, such as, for example, the working surfaces of the cylinders of an engine.

With a laser light wattage of approximately 2 kW on a beam spot having a diameter of about 0.5 to 2 mm, a feed rate of 300 to 1500 mm per minute, and a gas conveying rate of about 10 to 20 liters per minute, wherein a powder feed of up to 10 grams per minute, the probe is capable of treating the workpiece in the space allotted in a focused manner. For example, if the probe is focused on a surface site defined by spiral migration, upon completion of one turn (or rotation) of the probe, the surface site being treated may migrate over the entire surface area to be treated by simultaneously lowering the probe.

Thus, from 17% to 50% by volume of silicon is produced on the surface layer through alloying, whereby excess silicon powder is removed from the interior of the workpiece by transporting the excess powder away, especially together with the conveying gas.

With an increased laser light wattage of 4 kW focused on a beam spot with a diameter of 2 to 4 mm, and with a feed rate of 1500 to 4000 mm per minute, and having a conveying gas feed of about 30 liters per minute, and wherein a powder feed rate of up to 20 grams per minute is added, the probe can then be focused in the space provided on a spirally migrating surface site. Laser beam wattage of between 1.3 to 6 kW can be used with spot diameters of between 0.2 to 4 mm, and feed rates of between 300 to 4000 mm/min.

The means for guiding the laser beam, projects a beam of laser light via a collimating lens system onto a reversing mirror formed in the head of the probe. The focus can be formed with the reversing mirror, the latter being made of copper and cooled with water due to the high process temperatures. Furthermore, the mirror is preferably provided with an HR-coating. The mirror is a multifaceted mirror having from 5 to 50 facets with conically, thyroidal or parabolically shaped surfaces, which are arranged on conical segments.

While several embodiments of the invention have been shown and described, it is obvious that many changes may be made thereunto without departing from the spirit and scope of the invention.

What is claimed is:

1. A process for the laser treatment of the internal surfaces of a hollow body with a rotationally-symmetric cylindrical axes, the body being an engine block having cylinder bores for receiving piston rings and consisting of a matrix alloy such as light-metal cylinder blocks with wear-resisting internal piston working surfaces, comprising the steps of:

maintaining the hollow body in a stationary position;

producing a beam spot on the internal surface of the body with a laser beam probe having a distance energy of 20 to 800 J/mm and an intensity of 0.5 to 4.0 kW/mM$^2$;

applying an alloying powder thereto in a continuous conveying and protective gas;

displacing a probe along the axis of the cylinder;

simultaneously rotating said probe producing a zone of added alloy in spiral-shaped windings over the entire surface to be treated, wherein the windings overlap each other and are disposed along the cylinder bores with a spacing smaller than the width of the piston rings; and, melting the alloying powder in the spot of the laser beam to a depth of from 0.2 to 2 mm.

2. The process according to claim 1 wherein said alloying powder consists of silicon, having a hardened-phase content of between 17% to 50% by volume with a particle size of 3 to 35 $\mu$m being separated from the melt.

3. The process according to claim 1 wherein nickel, titanium or niobium with a particle size of 45 $\mu$m to 130 $\mu$m are employed as alloying powders.

4. The process according to claim 1 wherein said laser beam has a wavelength of between 800 to 1100 nm when alloying powder into the hollow body.

5. The process according to claim 1 wherein the interior surfaces of the hollow body has a shaft ratio of greater than 1:10 with a minimum diameter of 50 mm.

6. The process according to claim 1 wherein the laser beam wattage is between 1.3 to 6 kW.

7. The process according to claim 1 wherein the laser beam is a spot that is spirally moved over the entire surface to be treated.

8. The process according to claim 1 wherein the laser beam comprises a linear-shaped beam spot having an edge length of between 0.2 to 4 mm for treating the interior surfaces of the hollow body.

9. The process according to claim 1 wherein the feed rate of the probe having the beam spot on the circumference is between 300 to 4000 mm/min.

10. The process according to claim 1 wherein the cylinder working surface has a full covering at the point of reversal of the piston, and the remainder of the working surface has a partial covering by alloying particles diffused into the surface.

11. The process according to claim 10 comprising forming lubricating oil pockets into the working surface of the cylinder in the zone of partial covering.

12. The process according to claim 1 wherein a laser light beam wattage of 2 kW having a beam spot diameter of between 0.5 to 2 mm and a feed rate of between 300 to 1500 mm/min, and a process gas feed rate of between 10 to 20 liters/min, and a powder feed rate of between 1 to 10 g/min, so that between 17% to 50% of silicon by volume is alloyed into the internal surface.

13. The process according to claim 1 wherein excess alloying powders are blown out of the hollow body with the conveying gas.

* * * * *

UNITED STATES PATENT AND TRADEMARK OFFICE
CERTIFICATE OF CORRECTION

PATENT NO.    : 6,303,897 B1  
DATED         : October 16, 2001  
INVENTOR(S)   : Bady et al.

Page 1 of 1

It is certified that error appears in the above-identified patent and that said Letters Patent is hereby corrected as shown below:

<u>Title page,</u>
Item [73] please insert the name of the second assignee as follows:
-- NU TECH Gesellschaft für Lasertechnik Materialprüfung und Messtechnik mbH, Neumünster (DE) --

Signed and Sealed this

Fourteenth Day of May, 2002

*Attest:*

*Attesting Officer*

JAMES E. ROGAN
*Director of the United States Patent and Trademark Office*